United States Patent
Ishii et al.

(10) Patent No.: US 7,308,020 B2
(45) Date of Patent: Dec. 11, 2007

(54) SYSTEM AND METHOD OF INTERFERENCE SUPPRESSION

(75) Inventors: Hiroyuki Ishii, Yokohama (JP); Takayukii Ishiguro, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 848 days.

(21) Appl. No.: 10/365,608

(22) Filed: Feb. 13, 2003

(65) Prior Publication Data

US 2003/0185165 A1    Oct. 2, 2003

(30) Foreign Application Priority Data

Feb. 21, 2002    (JP) .............................. 2002-045101

(51) Int. Cl.
*H04B 1/00*    (2006.01)
(52) U.S. Cl. ...................... 375/148; 375/267; 375/147; 375/340; 375/130; 375/346; 455/63; 370/208
(58) Field of Classification Search ................ 375/267, 375/148, 147, 340, 130, 346; 455/63; 370/208
See application file for complete search history.

(56) References Cited

U.S. PATENT DOCUMENTS

| | | | |
|---|---|---|---|
| 5,127,051 A | | 6/1992 | Chan et al. |
| 5,414,734 A | * | 5/1995 | Marchetto et al. ........... 375/267 |
| 5,537,438 A | | 7/1996 | Mourot et al. |
| 5,606,580 A | | 2/1997 | Mourot et al. |
| 5,901,185 A | * | 5/1999 | Hassan ........................ 375/346 |
| 6,700,919 B1 | * | 3/2004 | Papasakellariou ............ 375/130 |
| 6,775,340 B1 | * | 8/2004 | Arslan et al. ................. 375/354 |
| 6,947,373 B2 | * | 9/2005 | Siala et al. ................... 370/208 |
| 2001/0006540 A1 | * | 7/2001 | Kim et al. .................... 375/340 |
| 2001/0036812 A1 | * | 11/2001 | Engstrom ...................... 455/63 |
| 2002/0003774 A1 | * | 1/2002 | Wang et al. .................. 370/208 |
| 2002/0101908 A1 | * | 8/2002 | Kim et al. .................... 375/147 |
| 2005/0265433 A1 | * | 12/2005 | Okumura et al. ............ 375/148 |
| 2006/0072654 A1 | * | 4/2006 | Nielsen ....................... 375/148 |

FOREIGN PATENT DOCUMENTS

WO    WO-0060761 A1    10/2000

OTHER PUBLICATIONS

S. Min and K. B. Lee"Pilot and Traffic Based Channel Estimation for DS/CDMA Systems", IEEE, pp. 1073-1074, May 1998.*

(Continued)

*Primary Examiner*—Chieh M. Fan
*Assistant Examiner*—Sudhanshu C. Pathak
(74) *Attorney, Agent, or Firm*—Crowell & Moring LLP

(57) ABSTRACT

To perform interference suppression for a received signal more precisely. Block dividing section divides a data part of a received slot into several blocks. Channel estimator calculates a channel estimate vector for each block and stores it into channel estimate storage device. Channel estimate calculator for each block calculates a channel estimate vector for each block by using a channel estimate vector calculated with a known series symbol part for the (current) slot and a channel estimate vector for a known series symbol part for a previous slot stored in channel estimate storage device. Then, channel equalizer and de-spreader perform a calculation such as a channel equalizing calculation by using a channel estimate vector for each block at each block.

18 Claims, 12 Drawing Sheets

OTHER PUBLICATIONS

Stefan A. Fechtel, et al., "Optimal Parametric Feedforward Estimation of Frequency-Selective Fading Radio Channels" IEEE Transactions on Communications, vol. 42, 1994, pp. 1639-1650.

John G. Proakis, "Interference Suppression in Spread Spectrum Systems" IEEE pp. 259-566, 1996.

* cited by examiner

US 7,308,020 B2

SYSTEM AND METHOD OF INTERFERENCE SUPPRESSION

BACKGROUND OF THE INVENTION

1. Field of the Invention

The present invention relates to system and method of interference suppression, more specifically to system and method of interference suppression for suppressing interference signal in mobile communication.

2. Description of the Related Art

In mobile communication systems such as CDMA (code division multiple access) and TDD (time division duplex), an interference suppression receiving method for suppressing interference caused by a delayed wave or a multi-user is implemented for increasing capacity for subscribers. A receiver calculates a channel estimate vector by using a known series symbol within a received slot for estimating variations in phase and amplitude of a received signal resulting from arrival timing for each chip level in each received slot or fading fluctuation of each propagation channel, and performs a channel equalizing calculation by using the channel estimate vector to suppress interference caused by a delayed wave or a multi-user within the slot.

An exemplary configuration of a conventional interference suppression receiving system will now be described with reference to FIG. 14. An interference suppression receiving system shown in FIG. 14 is a system whose input is a received signal including a known series symbol part for estimating a propagation channel and a data part and that outputs a demodulated signal by performing demodulation.

A data part of a received signal is divided into several blocks at block dividing process 11 and passed to suppression process 15 for suppressing an interference signal. At channel estimate calculation process 12, a channel estimate vector is calculated by using a known series symbol part of a received signal and passed to the suppression process 15.

In this manner, a conventional interference suppression receiving system uses a channel estimate vector calculated by using a known series symbol part, which is a part of a slot, as a channel estimate vector for the entire slot. However, under a high speed fading, this conventional system has a problem that an actual channel estimate vector for a data part becomes different from a channel estimate vector for a known series symbol because of fading.

SUMMARY OF THE INVENTION

The present invention is adapted for solving the above-mentioned problem of a conventional art. The present invention intends to provide a system and method of interference suppression that can perform an interference suppression on a received signal in more precise way than in conventional arts.

The interference suppression system according to claim 1 of the present invention is an interference suppression system for suppressing an interference signal for a received signal including a plurality of slots having a known series symbol part for estimating a propagation channel and a data part, including: block dividing means for dividing the above-mentioned data part of a received signal into a plurality of blocks; channel estimate calculation means for calculating a channel estimate for the current slot by using the above-mentioned known series symbol part of a received signal; channel estimate storage means for storing the channel estimate for the slot calculated at the above-mentioned channel estimate calculation means; channel estimate calculation means for each block for calculating a channel estimate for each block for each of the above-mentioned plurality of blocks by using a channel estimate for the current slot calculated at the above-mentioned channel estimate calculation means and a channel estimate stored in the above-mentioned channel estimate storage means; and suppression means for suppressing the above-mentioned interference signal by performing a calculation for each of the above-mentioned blocks by using the above-mentioned channel estimate for each block.

The interference suppression system according to claim 2 of the present invention is a system according to claim 1 wherein a calculation performed at the above-mentioned suppression means is single user detection.

The interference suppression system according to claim 3 of the present invention is a system according to claim 1 wherein a calculation performed at the above-mentioned suppression means is joint detection.

The interference suppression system according to claim 4 of the present invention is a system according to claim 1 wherein a calculation performed at the above-mentioned suppression means is RAKE combiner.

The interference suppression system according to claim 5 of the present invention is a system according to any one of claims from 1 to 4 wherein the above-mentioned channel estimate calculation means for each block previously calculates a channel estimate for the next slot and then calculates the above-mentioned channel estimate for each block for the above-mentioned current slot by using the calculated channel estimate for the next channel and a channel estimate for the above-mentioned current slot when the above-mentioned channel estimate storage means stores no channel estimate.

The interference suppression system according to claim 6 of the present invention is a system according to any one of claims from 1 to 5 wherein the above-mentioned block dividing means divides a data part of the above-mentioned received signal into as many blocks as the number corresponding to magnitude of a difference between a channel estimate for the current slot calculated at the above-mentioned channel estimate calculation means and a channel estimate stored in the above-mentioned channel estimate storage means.

The interference suppression system according to claim 7 of the present invention is a system according to any one of claims from 1 to 5 wherein the above-mentioned block dividing means divides the above-mentioned data part of a received signal into as many blocks as the number corresponding to magnitude of a fading frequency of a propagation channel.

The interference suppression system according to claim 8 of the present invention is a system according to any one of claims from 1 to 5 wherein the above-mentioned block dividing means divides the above-mentioned data part of a received signal into as many blocks as the number corresponding to a type of data modulation being used.

The interference suppression system according to claim 9 of the present invention is a system according to any one of claims from 1 to 5 wherein the above-mentioned block dividing means divides the above-mentioned data part of a received signal into as many blocks as the number corresponding to modulation and a coding rate being adaptively used.

An interference suppression method according to claim 10 of the present invention is an interference suppression method for suppressing interference signal for a received signal including a plurality of slots having a known series symbol part for estimating a propagation channel and a data part, including a block dividing step for dividing the above-mentioned data part of a received signal into a plurality of blocks, a channel estimate calculation step for calculating a channel estimate for the current slot by using the above-mentioned known series symbol part of a received signal, a channel estimate calculation step for each block for calculating a channel estimate for each block for each of the above-mentioned plurality of blocks by using a channel estimate for the current slot calculated at the above-mentioned channel estimate calculation step and a channel estimate for a previous slot, and a suppression step for suppressing the above-mentioned interference signal by performing a calculation for the above-mentioned each block by using the above-mentioned channel estimate for each block.

The interference suppression method according to claim 11 of the present invention is a method according to claim 10 wherein a calculation performed at the above-mentioned suppression step is single user detection.

The interference suppression method according to claim 12 of the present invention is a method according to claim 10 wherein a calculation performed at the above-mentioned suppression step is joint detection.

The interference suppression method according to claim 13 of the present invention is a method according to claim 10 wherein a calculation performed at the above-mentioned suppression step is RAKE combiner.

The interference suppression method according to claim 14 of the present invention is a method according to any one of claims from 10 to 13 wherein the above-mentioned channel estimate calculation step for each block further includes a step for previously calculating a channel estimate for the next slot when no channel estimate for previous slots exists, and wherein, when the channel estimate for the next slot is obtained, a channel estimate for each block for the above-mentioned current slot is calculated by using the channel estimate for the next slot and a channel estimate for the above-mentioned current slot.

The interference suppression method according to claim 15 of the present invention is a method according to any one of claims from 10 to 14 wherein at the above-mentioned block dividing step a data part of the above-mentioned received signal is divided into as many blocks as the number corresponding to magnitude of a difference between a channel estimate for the current slot calculated at the above-mentioned channel estimate calculation step and a channel estimate for a previous slot.

The interference suppression method according to claim 16 of the present invention is a method according to any one of claims from 10 to 14, wherein at the above-mentioned block dividing step, the above-mentioned data part of a received signal is divided into as many blocks as the number corresponding to magnitude of a fading frequency of a propagation channel.

The interference suppression method according to claim 17 of the present invention is a method according to any one of claims from 10 to 14 wherein at the above-mentioned block dividing step a data part of the above-mentioned received signal is divided into as many blocks as the number corresponding to a type of data modulation being used.

The interference suppression method according to claim 18 of the present invention is a method according to any one of claims from 10 to 14 wherein at the above-mentioned block dividing step, the above-mentioned data part of a received signal is divided into as many blocks as the number corresponding to modulation and a coding rate being adaptively used.

That is to say, the present invention can perform more precise interference suppression for a received signal than conventional arts by dividing a data part of a received slot into several blocks, calculating a channel estimate vector for each block on the basis of a channel estimate vector of previous slot and a channel estimate vector for the slot, and performing a calculation including a channel equalizing calculation for each block.

DETAILED DESCRIPTION OF THE PREFERRED EMBODIMENTS

Figure 1:
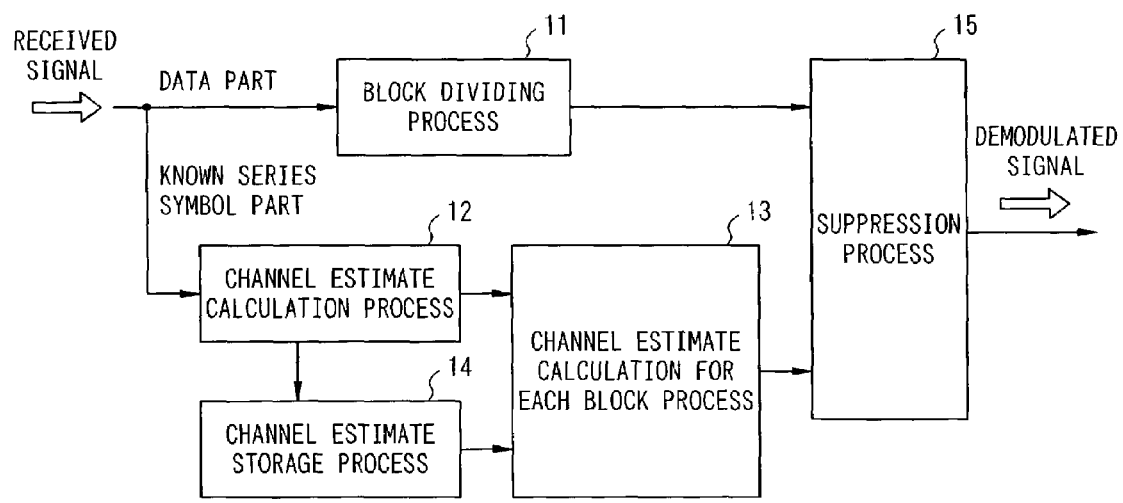
FIG. 1 is a block diagram illustrating an embodiment of the interference suppression system according to the present invention.

Next, embodiments of the present invention will be described with reference to drawings. In the drawings referred to in the following description, same parts are designated by same numerals.

FIG. 1 is a block diagram for illustrating an embodiment of the interference suppression system according to the present invention. As it is shown in FIG. 1, the interference suppression system according to the present invention is a system whose input is a received signal including a known series symbol part for estimating a propagation channel and a data part and that outputs a demodulated signal by performing demodulation for each slot.

In this system, a data part of a received signal is divided into several blocks at block dividing process 11 and then passed to suppression process 15 for suppressing interference signal.

At channel estimate calculation process 12, a channel estimate vector is calculated by using a known series symbol part of a received signal. The calculated channel estimate vector is stored at channel estimate storage process 14. At channel estimate calculation process for each block 13, a channel estimate for each block is calculated for each of the blocks by using the current channel estimate vector calculated at channel estimate calculation process 12 and the previous channel estimate vector stored at channel estimate storage process 14. The calculated channel estimate for each block is passed to suppression process 15 where interference signal is suppressed.

When no channel estimate vector is stored, i.e., no previous channel estimate vector exists, demodulation of the current slot is stopped temporarily, a channel estimate for the next slot are previously calculated, and when the channel estimate for the next slot is obtained, a channel estimate for each block for the current slot is calculated by using the channel estimate for the next slot and the channel estimate for the current slot.

Figure 2:
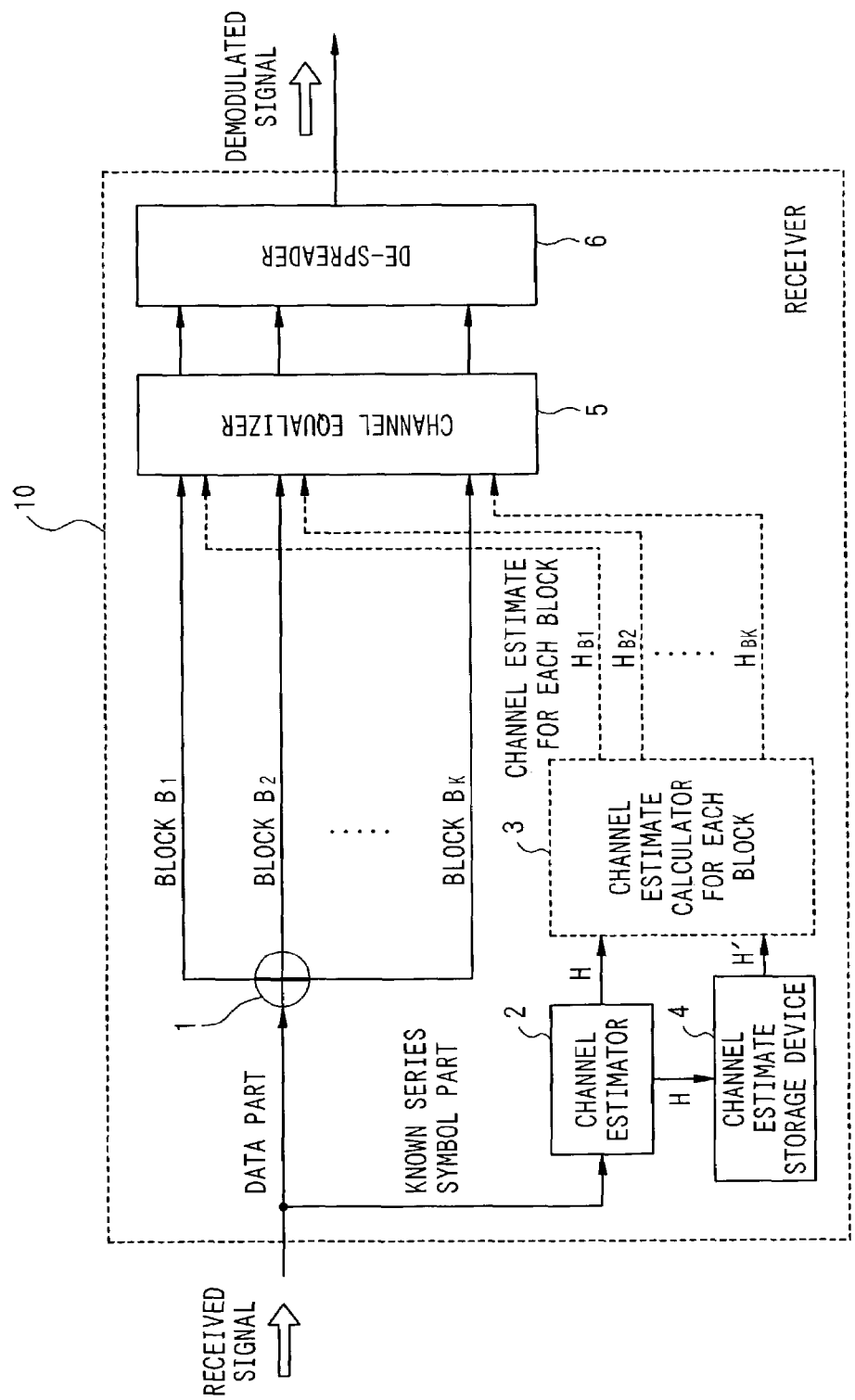
FIG. 2 is a block diagram showing a configuration of a first example of an interference suppression system according to the present invention.

To implement each process shown in FIG. 1, the system includes block dividing section 1 for dividing a data part of a received signal into a plurality of blocks, channel estimator 2 whose input is a known series symbol part of a received signal, channel estimate storage device 4 for storing a channel estimate vector calculated at channel estimator 2, channel estimate calculator for each block 3 whose input is a channel estimate vector calculated at channel estimator 2 and contents of channel estimate storage device 4, channel equalizer 5 whose input is an output from block dividing section 1 and an output from channel estimate calculator for each block 3 and that performs a channel equalizing calculation, and de-spreader 6 for performing de-spreading for an output from the channel equalizer 5 as shown in FIG. 2.

The block dividing section 1 divides a data part of a received signal into a plurality of blocks and outputs each of the divided blocks to channel equalizer 5.

The channel estimator 2 calculates a channel estimate vector H for estimating a propagation channel by using a known series symbol section, and outputs the channel estimate vector H for the current slot to channel estimate calculator for each block 3 and channel estimate storage device 4.

The channel estimate storage device 4 stores a channel estimate vector H calculated at channel estimator 2. Therefore, the channel estimate storage device 4 outputs a "channel estimate vector H' for a previous slot" to channel estimate calculator for each block 3 as it demodulates following slots.

The channel estimate calculator for each block 3 has a function that makes two types of operations available. One of the operations is outputting channel estimate vectors $H_{B1}$, $H_{B2}$, . . . , $H_{BK}$ for respective blocks to channel equalizer 5 via a known primary interpolation on the basis of a channel estimate vector H input from channel estimator 2 and a channel estimate vector H' input from channel estimate storage device 4. i.e., the interpolation between the channel estimate vector H of a current slot and the channel estimate vector H' of a previous slot. Another operation is outputting a channel estimate vector H to channel equalizer 5 as channel estimate vectors $H_{B1}$, $H_{B2}$, . . . $H_{BK}$ for respective blocks when neither a previous slot nor a channel estimate vector H' exists due to the burst reception.

The channel estimate calculator for each block 3 may be adapted to calculate a difference between a channel estimate vector H and a channel estimate vector H', and when the difference exceeds a specific threshold "g", perform the former of the above mentioned operations, and when the difference does not exceed a specific threshold, perform the latter of the above mentioned operations.

The channel estimate calculator for each block 3 may also be adapted to stop demodulation of the current slot, calculate a channel estimate for the next slot and then calculates a channel estimate for each block for the current slot by using the channel estimate for the next slot and a channel estimate for the current slot when no channel estimate for a previous slot exists. Incidentally, this "stop demodulation" means that the channel estimate calculator for each block 3 does not calculate a channel estimate for the current slot by using interpolation between the channel estimate vector of a current slot and none channel estimate vector of a burst, and the channel equalizer 5 does not perform a channel equalizing calculation for each block of a current slot.

The channel equalizer 5 performs a channel equalizing calculation for each block separately by using a channel estimate vector for each block obtained at channel estimate calculator for each block 3.

The de-spreader 6 de-spreads a signal of a data part that has been subjected to a channel equalizing calculation at channel equalizer 5.

A JD calculator may be used as in the eighth example as will be described below or a RAKE combiner may be used as in the ninth example described below instead of channel equalizer 5 and de-spreader 6. A JD calculator in this case is a calculator for performing joint-detection for each block separately by using an individual channel estimate vector for each block obtained at channel estimate calculator for each block 3. A RAKE combiner is a combiner for performing RAKE combination for each block separately by using an individual channel estimate vector for each block obtained at channel estimate calculator for each block 3.

EXAMPLES

First Example

Next, a first example of the present invention will be described in detail with reference to FIG. 2. In FIG. 2, receiver 10 receives a series of N slots, i.e., slot $S_1$, slot $S_2$, . . . , slot $S_N$ in the order of arrival as a received signal in burst mode.

Figure 3:
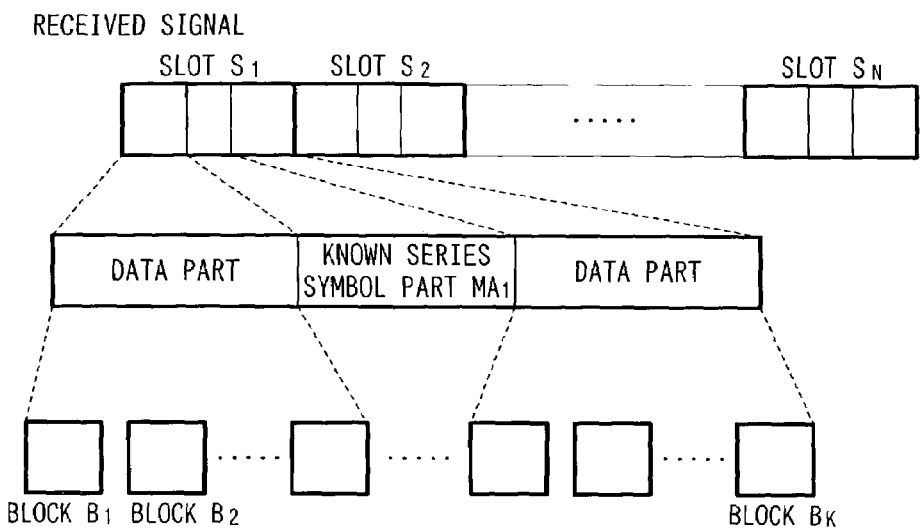
FIG. 3 is a diagram illustrating an arrangement of slots in the interference suppression system shown in FIG. 2.

As it is shown in FIG. 3, slot $S_1$, slot $S_2$, . . . , slot $S_N$ have a data part, i.e., data $D_1$, data $D_2$, . . . , data $D_N$, and a known series symbol for estimating a propagation channel for each path, i.e., $MA_1$, $MA_2$, . . . , $MA_N$, respectively. Receiver 10 in FIG. 2 demodulates slot $S_1$, slot $S_2$, . . . , slot $S_N$ in the order of arrival via demodulation described below.

First, receiver 10 receives and demodulates a series of incoming slots one by one. Block dividing section 1 of receiver 10 divides $n_{th}$ slot $S_N$ in N slots into a data part (data $D_N$) and a known series symbol part ($MA_N$) on receiving the slot $S_N$. Data $D_N$ is further divided into K blocks as shown in FIG. 3, i.e., block $B_1$, block $B_2$, . . . , block $B_K$. Each of these divided K blocks is output to channel equalizer 5.

A symbol part $MA_N$ is input into channel estimator 2, where a channel estimate vector H for slot $S_K$ is calculated.

The calculated channel estimate vector H is input and stored into channel estimate storage device 4, and also input into channel estimate calculator for each block 3.

The channel estimate calculator for each block 3 calculates channel estimate vectors $H_{B1}, H_{B2}, \ldots, H_{BK}$ for respective blocks by performing primary interpolation on a vector H and a vector H' when a "channel estimate vector H' for a previous slot" exists. When no "channel estimate vector H' for a previous slot" exists, the channel estimate calculator for each block 3 outputs a channel estimate vector H for the current slot to channel equalizer 5 as channel estimate vectors $H_{B1}, H_{B2}, \ldots, H_{BK}$ for respective blocks.

The channel equalizer 5 performs a channel equalizing calculation for respective blocks $B_1, B_2, \ldots, B_K$ by using channel estimate vectors $H_{B1}, H_{B2}, \ldots, H_{BK}$ for respective blocks. Then, de-spreader 6 performs de-spreading for demodulating the slot.

As described above, the system can perform more precise interference suppression for a received signal than conventional arts by dividing a data part of a received slot into several blocks, calculating a channel estimate vector for each block by using a channel estimate vector for a previous slot and a channel estimate vector for the slot, and performing a channel equalizing calculation for each block for a received signal.

Second Example

Figure 4:
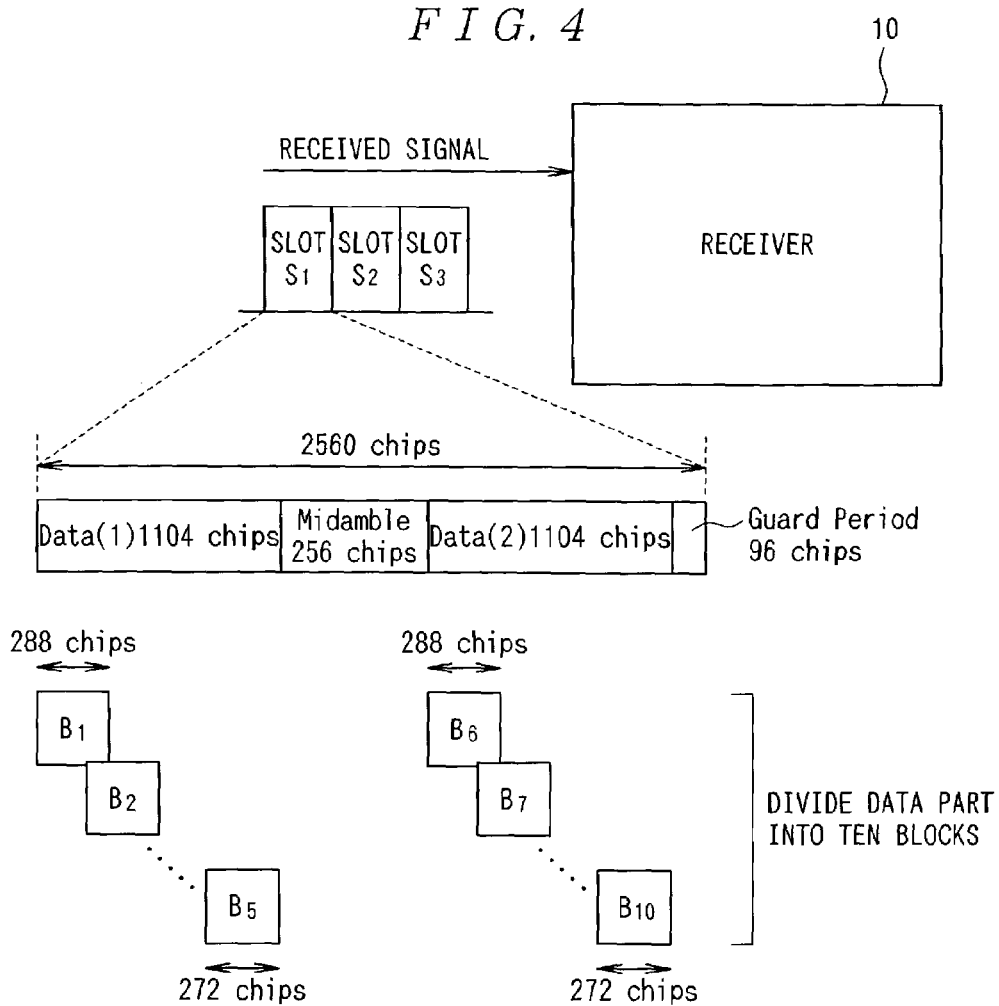
FIG. 4 is a diagram illustrating an arrangement of slots in CDMA/TDD system.

Now, a second example of the present invention will be described. FIG. 4 is a schematic view of the system adapted for IMT (International Mobile Telecommunications)—2000/CDMA/TDD system. In FIG. 4, each of the slots $S_1$, $S_2$, $S_3$ has 2560 chips in all, consisting of a known series symbol part Midamble (256 chips) placed at the center of a slot, two data parts sandwiching the known series symbol part Midamble, i.e., Data (1) (1104 chips) and Data (2) (1104 chips), and Guard Period (96 chips) at the right end of a slot.

Now, a downlink transmission of TTI=3 Time slot in CDMA/TDD system, where receiver 10 performs interference suppression receiving by using Single User Detection (referred to SUD hereinafter) as a receiving method is considered. SUD refers to suppressing interference caused by a delayed wave by performing a channel equalization at the chip level to restore the lost orthogonality of the user signals and then performing de-spreading. SUD is described in "Data Detection Algorithms Specially Designs for the Downlink of CDMA Mobile Radio Systems" written by Anja Klein, IEEE 47$^{th}$ Vehicular Technology Conference, pp. 203-207, May 1997.

As shown in FIG. 4, receiver 10 receives a series of three slots S1, S2, S3 as a received signal in burst mode and performs reception and demodulation via the demodulation in the above-mentioned first example. For example, each block has 288 chips but for the fifth block, which has 272 chips, with adjoining blocks overlapping 64 chips in consideration of delay. In this manner, the data part, which is the sum of Data (1) and Data (2), is divided into ten blocks, $B_1, B_2, \ldots, B_{10}$ as shown in FIG. 4. A channel estimate vector H for estimating a propagation channel for each slot is calculated by using known series symbol Midamble. The number of chips for each block is not limited to the above-mentioned examples.

In receiver 10, channel estimator 2 calculates a channel estimate vector $H_1$ by using Midamble of slot $S_1$ and outputs it to channel estimate calculator for each block 3 and channel estimate storage device 4 for the first slot $S_1$.

The channel estimate storage device 4 stores a channel estimate vector $H_1$ input from channel estimator 2. As the slot $S_1$ is the first slot received in burst mode, there is no channel estimate vector for a previous slot. Therefore, channel estimate storage device 4 outputs nothing to channel estimate calculator for each block 3. The channel estimate calculator for each block 3 obtains a channel estimate vector $H_1$ from channel estimator 2 and outputs $H_{B1}=H_1, H_{B2}=H_1, \ldots, H_{BK}=H_1$ as channel estimate vectors for respective blocks to channel equalizer 5 because it has no information from channel estimate storage device 4. The channel equalizer 5 performs SUD process for respective blocks $B_1, B_2, \ldots, B_K$ by using channel estimate vectors $H_{B1}, H_{B2}, \ldots, H_{BK}$ for respective blocks.

As for slot $S_2$, channel estimator 2 calculates a channel estimate vector $H_2$ by using Midamble of slot $S_2$ and outputs it to channel estimate calculator for each block 3 and channel estimate storage device 4. The channel estimate storage device 4 stores the channel estimate vector $H_2$ for slot $S_2$ input from channel estimator 2 and outputs a channel estimate vector H'=$H_1$ for a previous slot to channel estimate calculator for each block 3.

Figure 5:
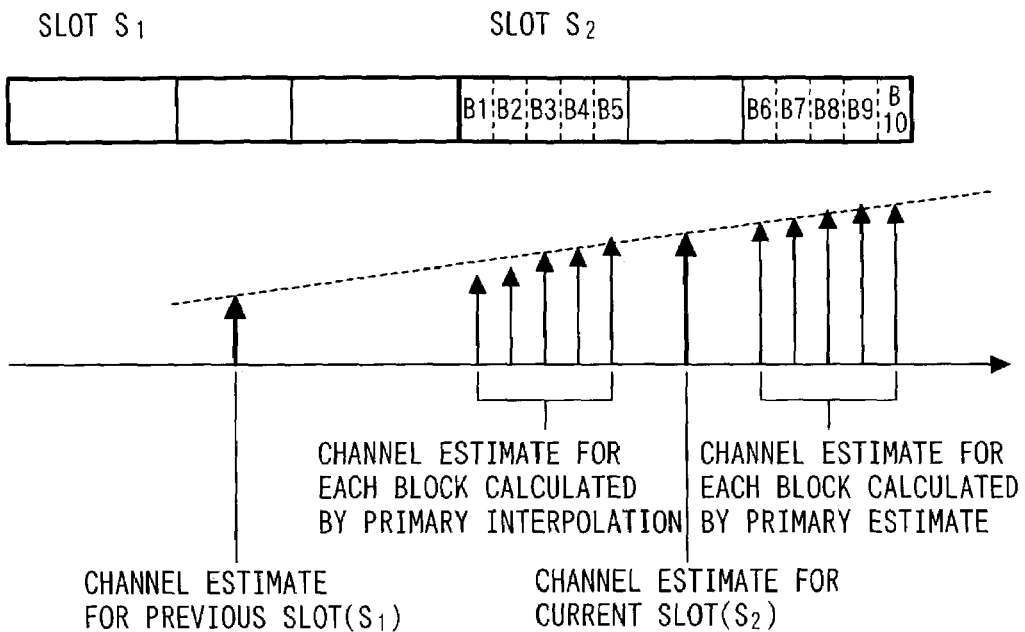
FIG. 5 is a conceptual diagram for calculating a channel estimate for each block by primary interpolation of a channel estimate for the previous slot and a channel estimate for the current slot.
Figure 6:
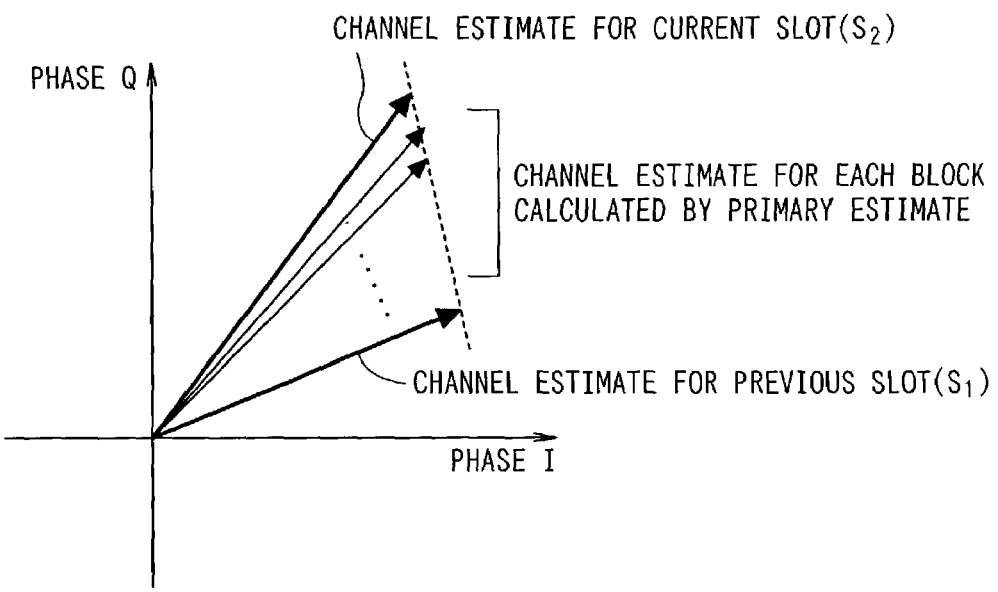
FIG. 6 is a conceptual diagram for calculating a channel estimate for each block by primary interpolation of a channel estimate for the previous slot and a channel estimate for the current slot in phase I and phase Q.

The channel estimate calculator for each block 3 performs a calculation as shown in FIGS. 5 and 6. This calculation is that channel estimate vectors $H_{B1}, H_{B2}, \ldots, H_{BK}$ for respective blocks are calculated by performing a primary interpolation on a channel estimate vector for the previous slot (slot in the past) $S_1$ and a channel estimate vector for the current slot (slot at present) $S_2$ as in shown in FIG. 5. Namely, a channel estimate vector for slot $S_1$, H'=$H_1$ and a channel estimate vector for slot $S_2$, H=$H_2$ are primarily interpolated in phase I and phase Q, respectively, as shown in FIG. 6. In this manner, channel estimate vectors $H_{B1}, H_{B2}, \ldots, H_{BK}$ for respective blocks are calculated.

For the next slot $S_3$ (not shown), a primary interpolation is performed on a channel estimate vector for the slot $S_3$ and a channel estimate vector for slot $S_2$ in the same manner.

Next, channel equalizer 5 in receiver 10 (see FIG. 2) demodulates data on slot $S_2$ by performing a SUD process for respective blocks $B_1, B_2, \ldots, B_K$ by using channel estimate vectors $H_{B1}, H_{B2}, \ldots, H_{BK}$ for respective blocks.

For slot $S_3$, as in the case of slot $S_2$, data on slot $S_3$ is demodulated by calculating a channel estimate vector for each block for slot $S_3$ by using a channel estimate vector for the previous slot $S_2$ and a channel estimate vector for slot $S_3$ and performing a SUD process for respective blocks $B_1$, $B_2, \ldots, B_K$ by using channel estimate vectors $H_{B1}$, $H_{B2}, \ldots, H_{BK}$ for respective blocks.

Third Example

Figure 7:
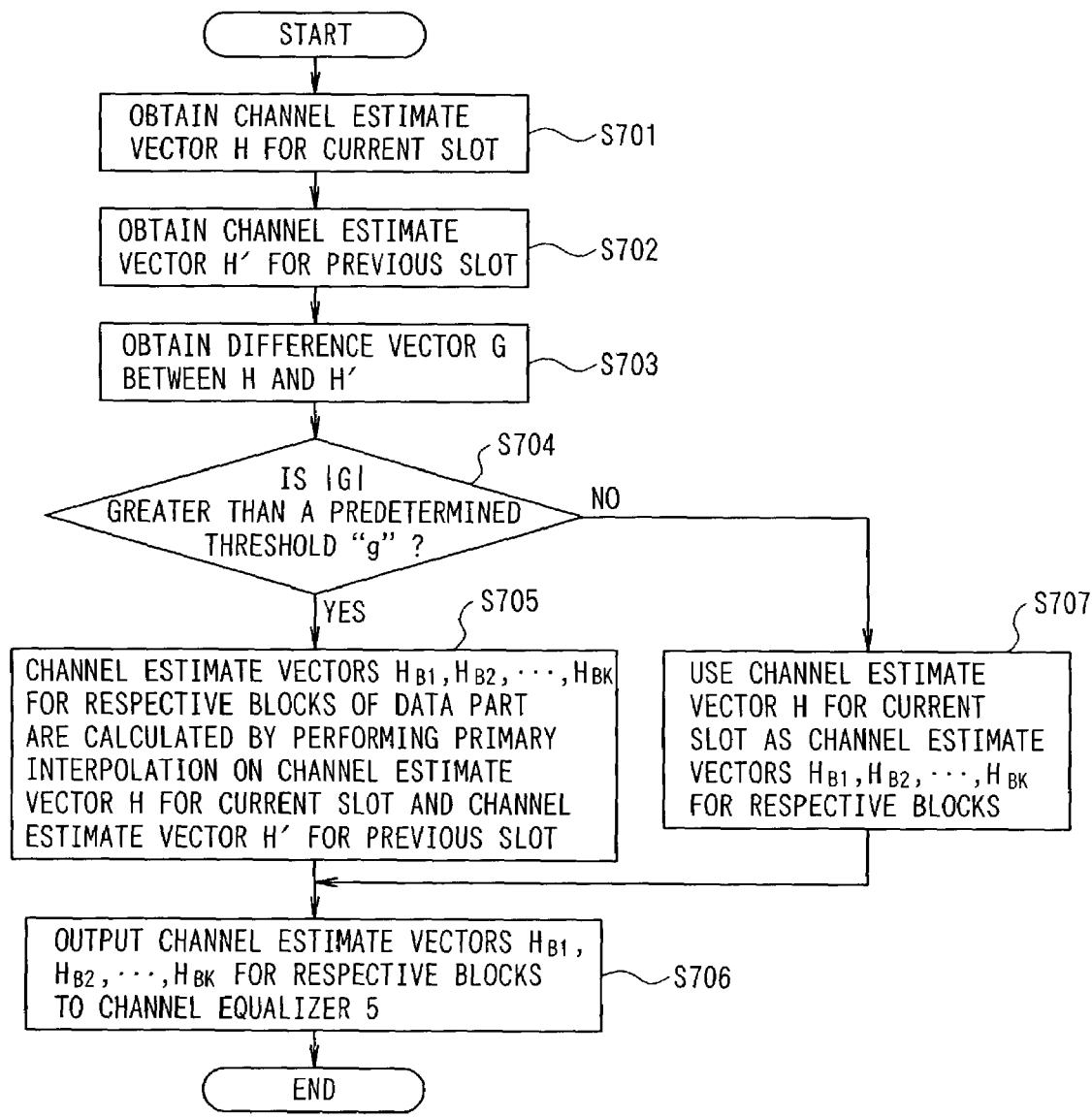
FIG. 7 is a flow chart showing a calculation of a third example of the interference suppression system according to the present invention.

In the above-mentioned second example, channel estimate calculator for each block 3 in demodulating slot $S_2$ can be adapted to perform operation switching as shown in FIG. 7. Now, the operation switching will be described.

First, a channel estimate vector H for the current slot is obtained (step S701). Next, a channel estimate vector H' for a previous slot is obtained (step S702). Then, a difference vector G between a channel estimate vector H and a channel estimate vector H' (step S703) is calculated. For example, a difference vector G between a channel estimate vector $H_2$ for slot $S_2$ and a channel estimate vector $H_1$ for slot $S_1$ is calculated.

When magnitude of the calculated difference vector G, |G| is greater than a predetermined threshold "g", a channel estimate vector for each block is calculated by performing primary interpolation on a channel estimate vector H and a channel estimate vector H' (steps S704->S705). For example, channel estimate vectors $H_{B1}, H_{B2}, \ldots, H_{BK}$ for respective blocks of slot $S_2$ are calculated by performing primary interpolation on a channel estimate vector $H_1$ and a channel estimate vector $H_2$. The calculated channel estimate vectors $H_{B1}, H_{B2}, \ldots, H_{BK}$ for respective blocks are output to channel equalizer (step S706).

When magnitude of the calculated difference vector G, |G| is less than a predetermined threshold "g", a channel estimate vector H is used as a channel estimate vector for each block (steps S704->S707). For example, a channel estimate vector $H_2$ for slot $S_2$ is used for channel estimate vectors $H_{B1}, H_{B2}, \ldots, H_{BK}$ for respective blocks. The channel estimate vectors $H_{B1}, H_{B2}, \ldots, H_{BK}$ for respective blocks are output to channel equalizer 5 (step S706). Channel estimate calculator for each block 3 performs the above-mentioned operation switching.

Channel estimate calculator for each block 3 also performs operation switching as shown in FIG. 7 for demodulation of slot $S_3$.

Namely, a difference vector G between a channel estimate vector $H_2$ for slot $S_2$ and a channel estimate vector $H_3$ for slot $S_3$ is calculated. When magnitude of the calculated difference vector G, |G| is greater than a predetermined threshold "g", channel estimate vectors $H_{B1}, H_{B2}, \ldots, H_{BK}$ for respective blocks of slot $S_3$ are calculated by performing primary interpolation on a channel estimate vector $H_2$ and a channel estimate vector $H_3$ for a previous slot and they are output to channel equalizer. When magnitude of the calculated difference vector G, |G| is less than a predetermined threshold "g", a channel estimate vector $H_3$ for slot $S_3$ is output to channel equalizer 5 as channel estimate vectors $H_{B1}, H_{B2}, \ldots, H_{BK}$ for respective blocks of slot $S_3$. This kind of operation switching can be performed.

Fourth Example

Figure 8:
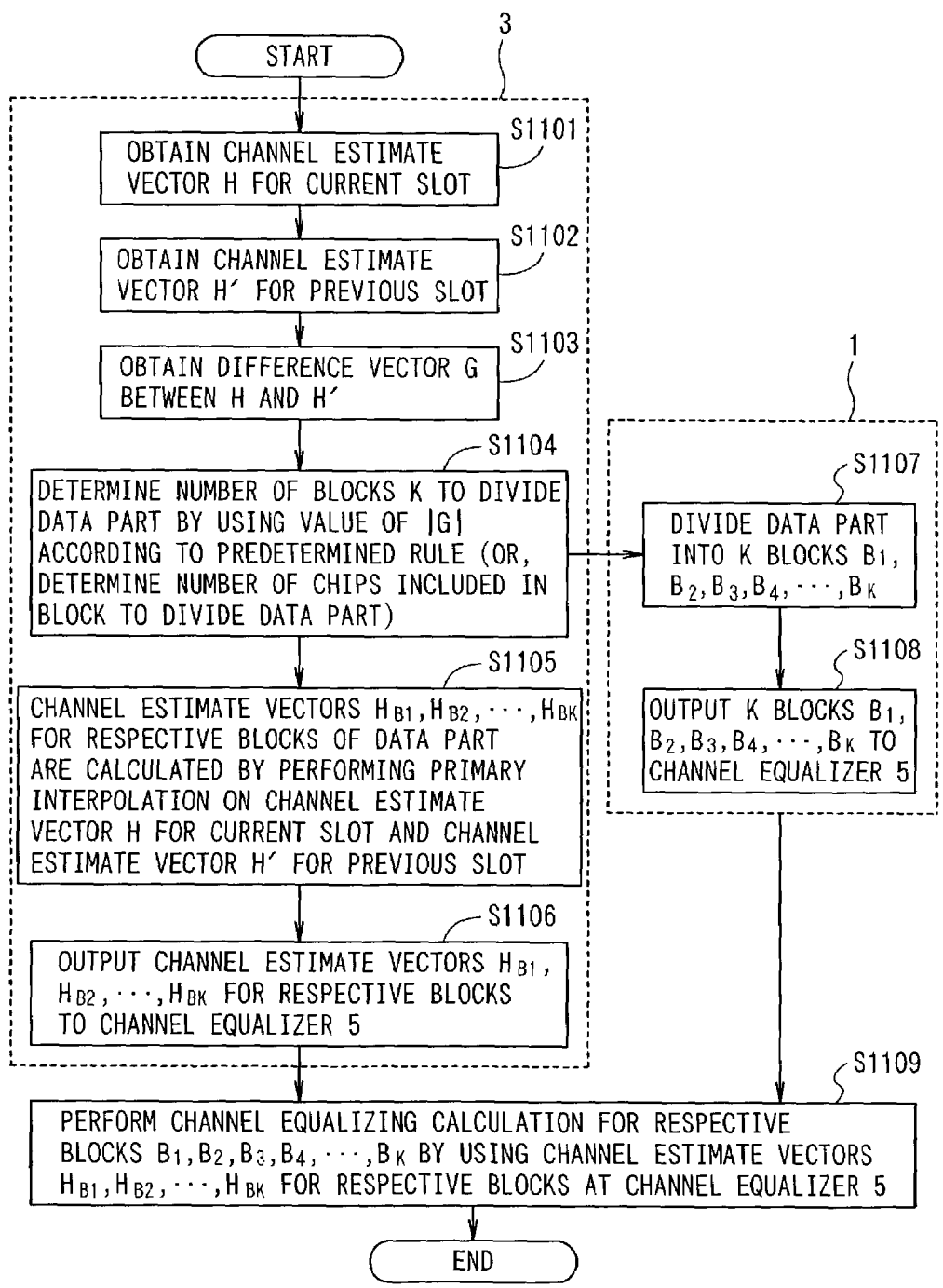
FIG. 8 is a flow chart showing a calculation of a forth example of the interference suppression system according to the present invention.

In the above-mentioned second example, block dividing section 1 and channel estimate calculator for each block 3 in demodulating slot $S_2$ can be adapted to perform switching of the number of blocks to be divided as shown in FIG. 8. Switching of the number of blocks to be divided will be described with reference to FIG. 8.

First, channel estimate calculator for each block 3 obtains a channel estimate vector H for the current slot (step S1101). Next, a channel estimate vector H' for a previous slot is obtained (step 1102). Then, a difference between a channel estimate vector H for the current slot and a channel estimate vector H' for a previous slot is calculated (step S1103). For example, a difference vector G between a channel estimate vector $H_2$ for slot $S_2$ and a channel estimate vector $H_1$ for slot $S_1$ is calculated.

The number of blocks K to divide Data part (1) or Data part (2) is determined according to a predetermined rule by using magnitude of the calculated difference vector |G| (step S1104). For example, the number of blocks K to divide is determined according to such a rule as when magnitude |G| is less than a predetermined threshold "$g_1$", the number of blocks is determined to be two, when magnitude |G| is between a predetermined threshold "$g_1$", and "$g_2$", the number of blocks is determined to be ten, and when magnitude |G| is greater than a predetermined threshold "$g_2$", the number of blocks is determined to be 16. Instead of determining the number of blocks, the number of chips included in a block to divide may be determined. Namely, a data part of a received signal is divided into as many blocks as the number corresponding to magnitude of a channel estimate.

Then the number of blocks K is output to block dividing section 1, while channel estimate vectors $H_{B1}, H_{B2}, \ldots, H_{BK}$ for respective blocks are calculated by performing primary interpolation on a channel estimate H and a channel estimate H', and the calculated channel estimate vectors $H_{B1}, H_{B2}, H_{BK}$ for respective blocks are output to channel equalizer 5 (steps S1105->S1106).

The block dividing section 1 divides Data part (1) and Data part (2) into K blocks, $B_1, B_2, \ldots, B_K$ and outputs the K blocks to channel equalizer 5 (steps S1107->1108).

Block dividing section 1 and channel estimate calculator for each block 3 perform the above-mentioned switching operation for the number of blocks to divide. Then, channel equalizer 5 performs a channel equalizing calculation for respective blocks $B_1, B_2, \ldots, B_K$ by using channel estimate vectors for respective blocks $H_{B1}, H_{B2}, \ldots, H_{BK}$ (step S1109).

Slot $S_3$ is processed in the same manner.

Fifth Example

Figure 9:
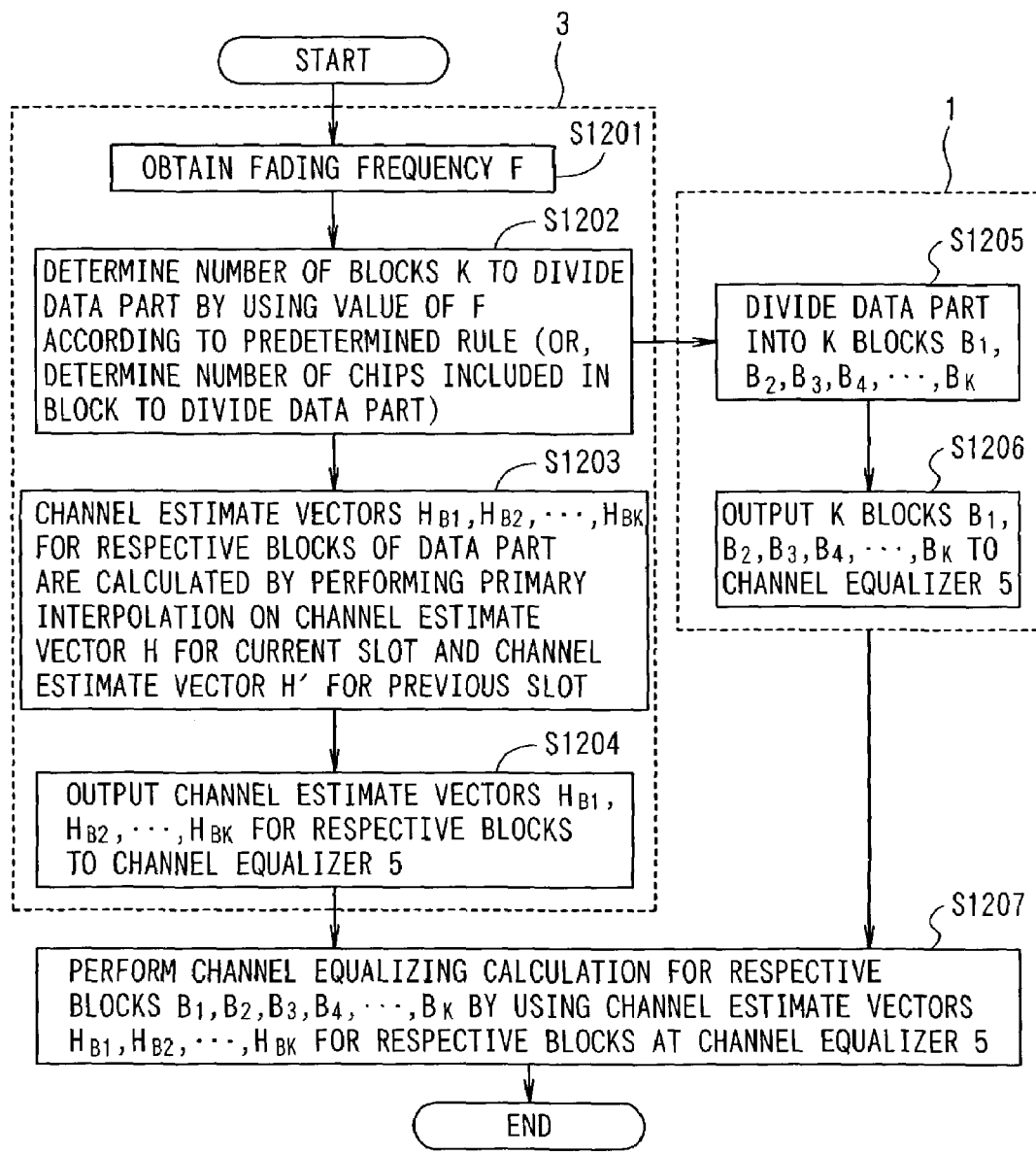
FIG. 9 is a flow chart showing a calculation of a fifth example of the interference suppression system according to the present invention.

In the above-mentioned second example, block dividing section 1 and channel estimate calculator for each block 3 in demodulating slot $S_2$ may be adapted to perform a switching operation for the number of blocks to divide as shown in FIG. 9. The switching operation for the number of blocks to divide will be described with reference to FIG. 9.

First, channel estimate calculator for each block 3 obtains a fading frequency F for a propagation channel (step S1201). The number of blocks K to divide Data part (1) or Data part (2) is determined according to a predetermined rule by using this fading frequency F (step S1202). For example, the number of blocks to divide is determined according to such a rule as when a fading frequency F is less than a predetermined threshold "$f_1$", the number of blocks is determined to be two, when a fading frequency F is between a predetermined threshold "$f_1$" and "$f_2$", the number of blocks is determined to be ten, and when a fading frequency F is greater than a predetermined threshold "$f_2$", the number of blocks is determined to be 16. Instead of determining the number of blocks, the number of chips included in a block to divide may be determined. Namely, a data part of a received signal is divided into as many blocks as the number corresponding to magnitude of a fading frequency of a propagation channel.

Then the number of blocks K is output to block dividing section 1, while channel estimate vectors $H_{B1}, H_{B2}, \ldots, H_{BK}$ for respective blocks are calculated by performing primary interpolation on a channel estimate vector H and a channel estimate vector H', and the calculated channel estimate vectors $H_{B1}, H_{B2}, \ldots, H_{BK}$ for respective blocks are output to channel equalizer 5 (steps S1203->S1204).

Block dividing section 1 divides Data part (1) and Data part (2) into K blocks $B_1, B_2, \ldots, B_K$ and outputs the K blocks to channel equalizer 5 (steps S1205->S1206).

Block dividing section 1 and channel estimate calculator for each block 3 perform the above-mentioned switching operation for the number of blocks to divide. Channel equalizer 5 performs a channel equalizing calculation for respective blocks $B_1, B_2, \ldots, B_K$ by using channel estimate vectors $H_{B1}, H_{B2}, \ldots, H_{BK}$ for respective blocks $H_{B1}, H_{B2}, \ldots, H_{BK}$ (step S1207).

Slot $S_3$ is processed in the same manner.

Sixth Example

Figure 10:
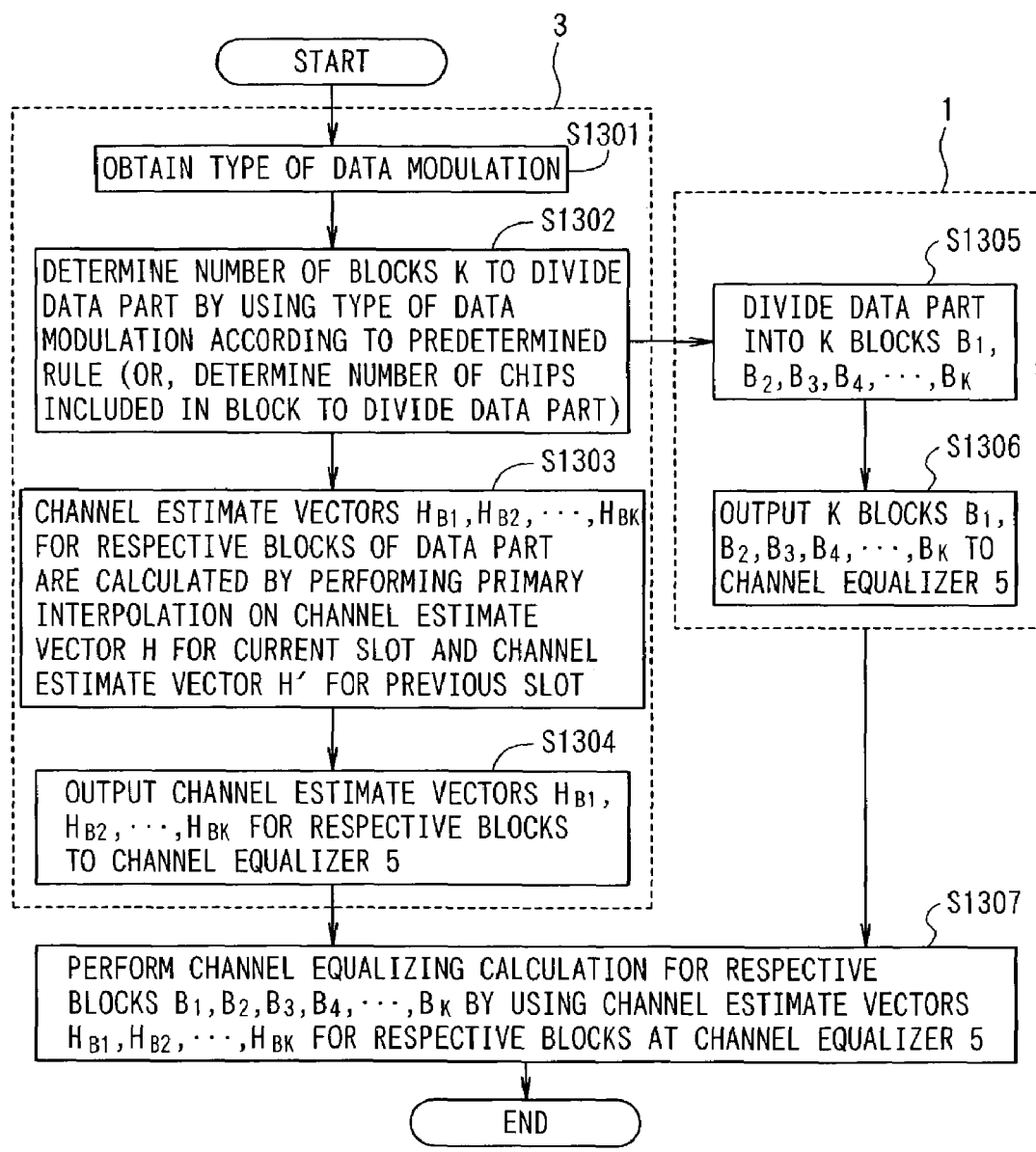
FIG. 10 is a flow chart showing a calculation of a sixth example of the interference suppression system according to the present invention.

In the above-mentioned second example, block dividing section 1 and channel estimate calculator for each block 3 in demodulating slot $S_2$ may be adapted to perform a switching operation for the number of blocks to divide as shown in FIG. 10. The switching operation for the number of blocks to divide will be described with reference to FIG. 10.

First, channel estimate calculator for each block 3 obtains a type of data modulation (step S1301). The number of blocks K to divide Data part (1) and Data part (2) is determined on the basis of a predetermined rule according to the type of data modulation (step S1302). For example, the number of blocks K to divide is determined according to such a rule as when a type of data modulation is QPSK (Quadrature Phase Shift Keying), the number of blocks is determined to be two, when a type of data modulation is 16 QAM (Quadrature Amplitude Modulation), the number of blocks is determined to be ten, and when a type of data modulation is 64 QAM, the number of blocks is determined to be 16. Instead of determining the number of blocks, the number of chips included in a block to divide may be determined. Namely, a data part of a received signal is divided into as many blocks as the number corresponding to a type of data modulation being used.

Then, the number of blocks K is output to block dividing section 1, while channel estimate vectors $H_{B1}, H_{B2}, \ldots, H_{BK}$ for respective blocks are calculated by performing primary interpolation on a channel estimate H and a channel estimate H', and the calculated channel estimate vectors $H_{B1}, H_{B2}, \ldots, H_{BK}$ for respective blocks are output to channel equalizer 5 (steps S1303->S1304).

Block dividing section 1 divides Data part (1) and Data part (2) into K blocks $B_1, B_2, \ldots, B_K$ and outputs the K blocks to channel equalizer 5 (steps S1305->S1306).

Block dividing section 1 and channel estimate calculator for each block 3 perform the above-mentioned switching operation for the number of blocks to divide. Channel equalizer 5 performs a channel equalizing calculation for respective blocks $B_1, B_2, \ldots, B_K$ by using channel estimate vectors $H_{B1}, H_{B2}, \ldots, H_{BK}$ for respective blocks (step S1307).

Slot $S_3$ is processed in the same manner.

Seventh Example

In the above-mentioned second example, a case in which receiver 10 performs adaptive modulation and coding where modulation and a coding rate in a turbo-coding adaptively changes according to quality of radio communication or traveling speed of a receiver is considered. MCS (Modulation and Coding scheme) levels to adaptively change are MCS level $L_1$, MCS level $L_2$, . . . , MCS level $L_M$. An MCS level refers to an incorporation of modulation and coding rate being used.

Figure 11:
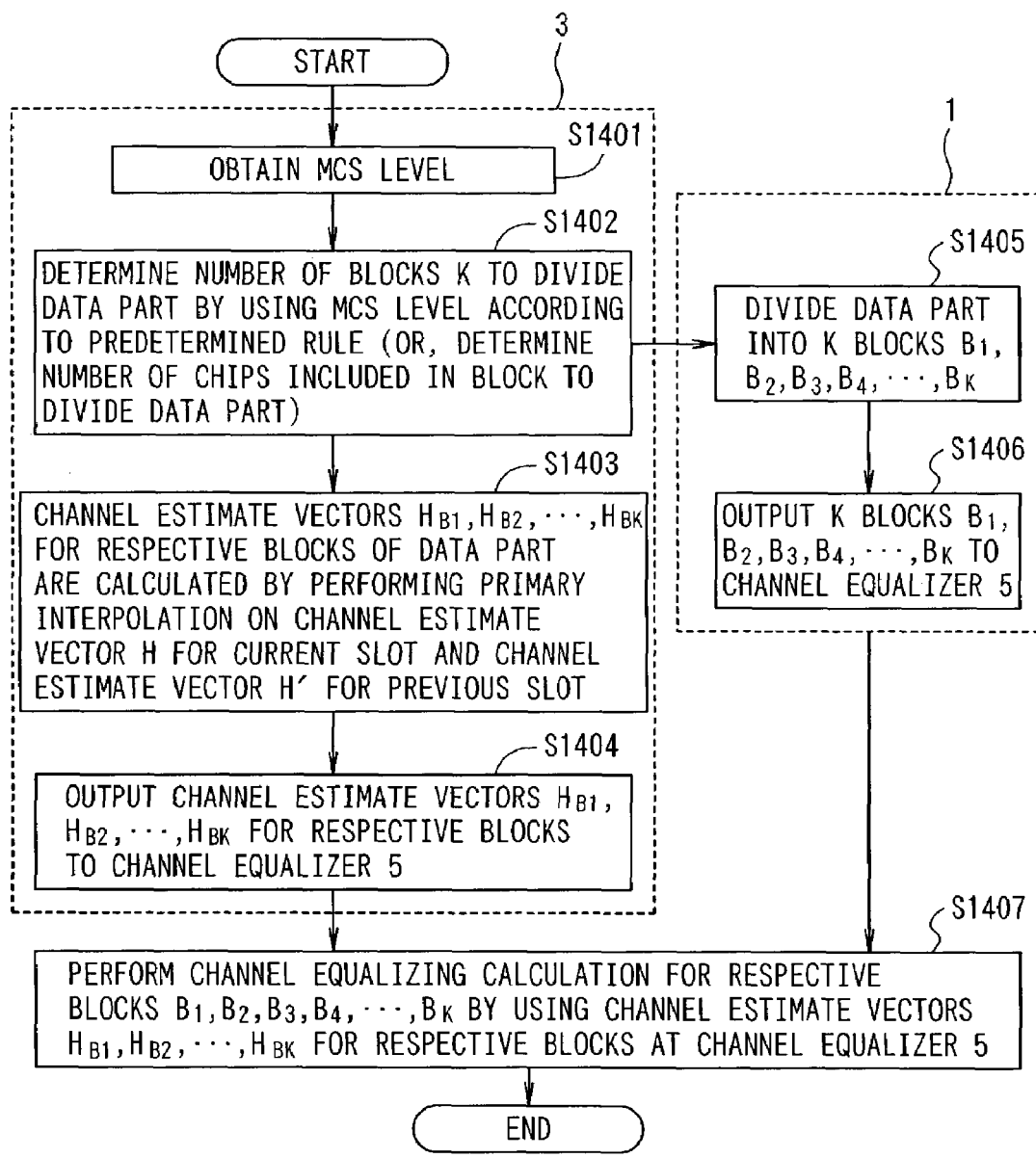
FIG. 11 is a flow chart showing a calculation of a seventh example of the interference suppression system according to the present invention.

Block dividing section 1 and channel estimate calculator for each block 3 in demodulating slot $S_2$ may be adapted to perform a switching operation of the number of blocks to divide as shown in FIG. 11. Block dividing switching operation is described with reference to FIG. 11.

First, channel estimate calculator for each block 3 obtains the currently used MCS level (step S1401). The number of blocks K to divide Data part (1) and Data part (2) is determined from the obtained MCS level according to a predetermined rule (step S1402). For example, the number of blocks K to divide is determined according to such a rule as when a type of data modulation is MCS level $L_1$, the number of blocks is determined to be two, when it is MCS level $L_2$, the number of blocks is determined to be ten, and when it is MCS level $L_3$, the number of blocks is determined to be 16. Instead of determining the number of blocks, the number of chips included in a block to divide maybe determined. Namely, a data part of a received signal is divided into as many blocks as the number corresponding to modulation and coding rate being adaptively used.

Then, the number of blocks K is output to block dividing section 1, while channel estimate vectors $H_{B1}, H_{B2}, \ldots, H_{BK}$ for respective blocks are calculated by performing primary interpolation on a channel estimate H and a channel estimate H', and the calculated channel estimate vectors $H_{B1}, H_{B2}, \ldots, H_{BK}$ for respective blocks are output to channel equalizer 5 (steps S1403->S1404).

Block dividing section 1 divides Data part (1) and Data part (2) into K blocks $B_1, B_2, \ldots, B_K$ and outputs the K blocks to channel equalizer 5 (steps S1405->S1406).

Block dividing section 1 and channel estimate calculator for each block 3 perform the above-mentioned switching operation for the number of blocks to divide. Channel equalizer 5 performs a channel equalizing calculation for respective blocks $B_1, B_2, \ldots, B_K$ by using channel estimate vectors $H_{B1}, H_{B2}, \ldots, H_{BK}$ for respective blocks (step S1407).

Slot $S_3$ is processed in the same manner.

Eighth Example

Figure 12:
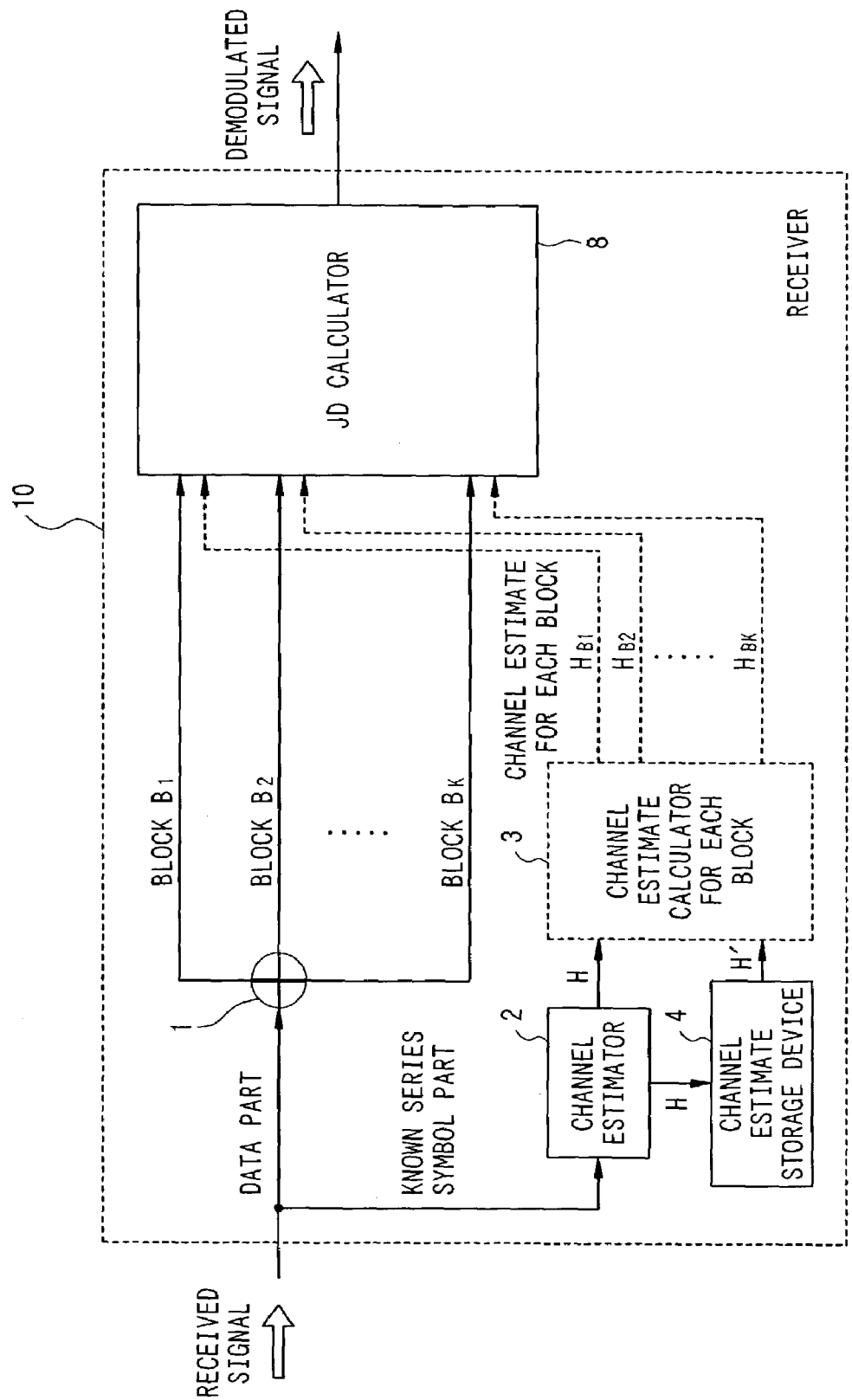
FIG. 12 is a block diagram showing a configuration of an eighth example of the interference suppression system according to the present invention.

In the above-mentioned second example, interference suppression receiving can be performed by using Joint Detection (hereinafter referred as JD) as receiving method instead of SUD. In this case, JD calculator 8 is provided instead of channel equalizer 5 and de-spreader 6 within receiver 10 shown in FIG. 2 as illustrated in FIG. 12.

JD refers to suppressing interference via a calculation by using a matrix derived from a channel estimate and a spread code. This calculation will be summarized below. First, B is calculated by using C×H ("×" is a convolutional calculator) for a spread code C and a channel estimate vector H. In this manner, if the number of multiplexed code is 4, for example, B1=C1×H1, B2=C2×H2, B3=C3×H3, B4=C4×H4 are obtained. Next, a channel estimate matrix A is generated on the basis of B1-B4. A demodulated signal "d" is calculated by using the solution of a calculation $(A^H A + \sigma^2 I) d = A^H e$, which uses a received signal "e" and a channel estimate matrix A. $A^H$ is a complex conjugation transposed matrix for a channel estimate matrix A, σ is a coefficient for suppressing a thermal noise, and I is a unit matrix. JD is described in "Zero Forcing and Minimum Mean-Square-Error Equalization for Multiuser Detection in Code-Division Multiple Access Channel", IEEE TRANSSACTIONS ON VEHICULAR TECHNOLOGY, Vol. 45, No. 2, May 1996, pp. 276-287 (written by Anja Klein).

Ninth Example

Figure 13:
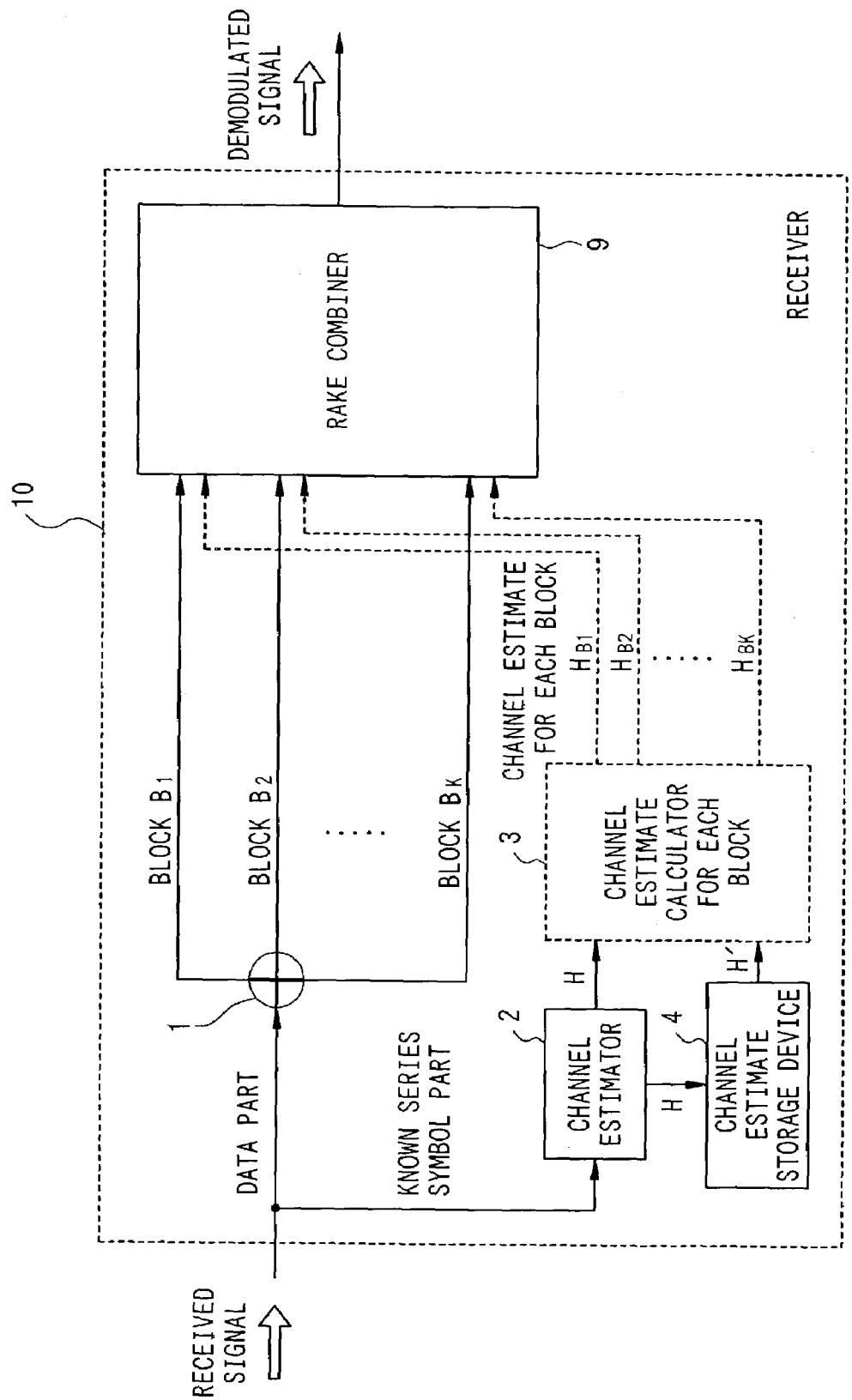
FIG. 13 is a block diagram showing a configuration of a ninth example of the interference suppression system according to the present invention.
Figure 14:
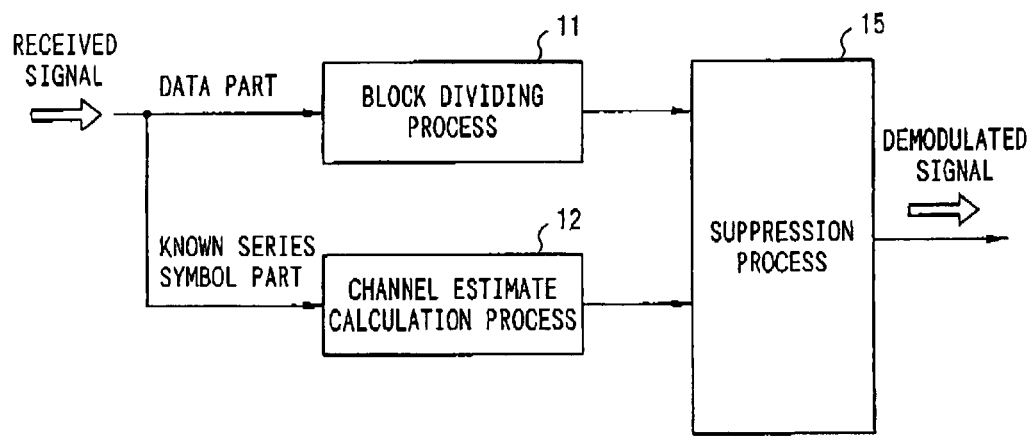
FIG. 14 is a block diagram showing a configuration of the conventional interference suppression system.

In the above-mentioned second example, interference suppression receiving can be performed by using RAKE combination as a receiving method instead of SUD. In this case, RAKE combiner 9 is provided instead of channel equalizer 5 or de-spreader 6 within receiver 10 shown in FIG. 2 as illustrated in FIG. 13. RAKE combination refers to performing a calculation in which each of electric waves incoming through respective paths is independently de-spread via several prepared de-spreading circuits and then multiplexed later with a time lag.

Tenth Example

In the above-mentioned second example, receiver 10 may be adapted to stop demodulation of a first slot $S_1$ at the process at channel estimate calculator for each block 3, start demodulation of a second slot $S_2$, restart demodulation of slot $S_1$ when channel estimate calculator 2 calculates a channel estimate vector for slot $S_2$, calculate a channel estimate vector for each block for slot $S_1$ by performing primary interpolation on a channel estimate vector $H_2$ for slot $S_2$ and a channel estimate vector $H_1$ for slot $S_1$, and output a channel estimate vector for each block to channel equalizer 5, and channel equalizer 5 may be adapted to perform a channel equalizing calculation for each block and de-spreader 6 may be adapted to perform de-spreading, respectively. Demodulation of slots following slot $S_2$ is performed in the same manner as in the second example.

Eleventh Example

In the above-mentioned second example, it is possible to adopt such methods as one for performing secondary interpolation instead of primary interpolation on a channel estimate vector H for a previous slot and a channel estimate vector H' for the current slot in terms of an I component and a Q component respectively or one for representing two channel estimate vectors by polar coordinates and performing primary interpolation in terms of an amplitude part and a phase part respectively. In this manner, more precise estimate can be obtained than in conventional arts.

As in the above-mentioned manner, the system can perform a channel equalizing calculation by using more precise channel estimate vector even at a data part away from a known series symbol part than in conventional arts, which improves a bit error rate under a high-speed fading environment.

The above-mentioned switching operation of the third to seventh example may reduce a process of calculating a channel estimate vector for each block when fading is slow. Thus, load of a receiver may be lighten.

Moreover, the above-mentioned calculation for slot $S_1$ of the ninth example can improve a bit error rate.

INTERFERENCE SUPPRESSION METHOD

Above-mentioned interference suppression system implements an interference suppression method, which is an interference suppression method for suppressing an interference signal for a received signal including a plurality of slots having a known series symbol part for estimating a propagation channel and a data part, including a block dividing step for dividing the above-mentioned data part of a received signal into a plurality of blocks, a channel estimate calculation step for calculating a channel estimate for the current slot by using the above-mentioned known series symbol part of a received signal, a channel estimate calculation step for each block for calculating a channel estimate for each block for each of the above-mentioned plurality of blocks by using a channel estimate for the current slot calculated at the above-mentioned channel estimate calculation step and a channel estimate for a previous slot, and a suppression step for suppressing the above-mentioned interference signal by performing a calculation for each of the above-mentioned blocks by using the above-mentioned channel estimate for each block.

A calculation performed in the above-mentioned suppression step may be single user detection, joint detection, or RAKE combination.

Above-mentioned channel estimate calculation step for each block may further include a step for previously calculating a channel estimate for the next slot when no channel estimate for a previous slot exists, so that the above-mentioned channel estimate for each block for the current slot may be calculated by using the channel estimate for the next slot and the above-mentioned channel estimate for the current slot after obtaining the channel estimate for the next slot.

The above-mentioned dividing step may divide a data part of the above-mentioned received signal into as many blocks as the number corresponding to magnitude of a difference between a channel estimate for the current slot calculated at the above-mentioned channel estimate calculation step and a channel estimate for a previous slot, or may divide a data part of the above-mentioned received signal into as many blocks as the number corresponding to magnitude of a fading frequency of a propagation channel, or may divide a data part of the above-mentioned received signal into as many blocks as the number corresponding to a type of modulation being used, or may divide a data part of the above-mentioned received signal into as many blocks as the number corresponding to modulation and a coding rate being adaptively used.

Namely, a data part of a received slot is divided into several blocks in the method. A channel estimate vector for each block is calculated by using a channel estimate vector calculated by using a known series symbol part of the (current) slot and a channel estimate vector of a known series symbol part of a previous slot. In each block, a channel equalizing calculation is performed with a channel estimate vector for each block. When no channel estimate vector for a known series symbol part of a previous slot exists, a channel estimate for the next slot is previously calculated and, when the channel estimate for the next slot is obtained, a channel estimate for each block for the current slot is calculated by using the channel estimate for the next slot and a channel estimate for the current slot.

The above-mentioned process allows a channel-equalizing calculation with more precise channel estimate vector than conventional arts to be performed even in a data part away from a known series symbol part so that a bit error rate can be improved under a high-speed fading environment.

As shown in above, the present invention has an advantage of performing a channel equalizing calculation with more precise channel estimate vector than in conventional arts even in a data part away from a known series symbol part by dividing a data part of a received slot into several blocks, calculating a channel estimate vector for each block by using a channel estimate vector for a previous slot and a channel estimate vector for the slot, and performing a calculation such as a channel equalizing calculation for each block, so that it can improve a bit error rate under a high-speed fading environment.

Above-mentioned interference suppression systems and methods may be adapted not only to CDMA-TDD systems such as TD-CDMA system and TD-SCDMA system, but also to CDMA-FDD systems, such as W-CDMA system and CDMA2000 system.

What is claimed is:

1. An interference suppression system for suppressing an interference signal for a received signal including a plurality of slots having a known series symbol part for estimating a propagation channel and a data part, comprising:
  block dividing means for dividing said data part of each slot of the received signal into a plurality of blocks;
  a first channel estimate calculation means for calculating a channel estimate for a current slot of the plurality of slots by using said known series symbol part of a received signal;
  channel estimate storage means for storing the first channel estimate for the slot calculated at said first channel estimate calculation means;

a second channel estimate calculation means for each block for calculating a channel estimate for each block corresponding to each of said plurality of blocks by using a result of primary interpolation between a channel estimate for the current slot calculated at said first channel estimate calculation means and a channel estimate stored for a previous slot in said channel estimate storage means; and suppression means for suppressing said interference signal by performing a calculation for each of said blocks corresponding to said channel estimate for each block by using said channel estimate for each block.

2. The interference suppression system according to claim 1, wherein a calculation performed at said suppression means is single user detection.

3. The interference suppression system according to claim 1, wherein a calculation performed at said suppression means is joint detection.

4. The interference suppression system according to claim 1, wherein a calculation performed at said suppression means is RAKE combination.

5. The interference suppression system according to claim 1, wherein
said second channel estimate calculation means for each block does not calculate a channel estimate for each block when no channel estimate for a previous slot is stored in said channel estimate storage means, and demodulation of the current slot is stopped;
the first channel estimate calculation means calculates a channel estimate for a next slot; and
the second channel estimate calculation means for each block for calculating a channel estimate for each block corresponding to each of said plurality of blocks for the current slot by using a result of primary interpolation between a channel estimate for the next slot and a channel estimate stored for the current slot in said channel estimate storage means.

6. The interference suppression system according to claim 1, wherein
said second channel estimate calculation means for each block determines the number of blocks corresponding to a magnitude of a difference between a channel estimate calculated at said first channel estimate calculation moans and a channel estimate stored in said channel estimate storage means, and
then said block dividing means divides said data part of a received signal into a plurality of blocks as the number of blocks determined by said second channel estimate calculation means for each block.

7. The interference suppression system according to claim 1, wherein
said second channel estimate calculation means for each block determines the number of blocks corresponding to a result of comparison between a fading frequency of a propagation channel and threshold values f1, f2,
then said block dividing means divides said data part of a received signal into a plurality of blocks as the number of blocks determined at said second channel estimate calculation means for each block.

8. The interference suppression system according to claim 1, wherein
said second channel estimate calculation means for each block determines the number of blocks corresponding to a type of data modulation being used,
then said block dividing means divides said data part of a received signal into a plurality of blocks as the number of blocks determined at said second channel estimate calculation means for each block.

9. The interference suppression system according to claim 1, wherein
said second channel estimate calculation means for each block determines the number of blocks corresponding to a modulation and a coding rate being adaptively used,
then said block dividing means divides said data part of a received signal into a plurality of blocks as the number of blocks determined at said second channel estimate calculation means for each block.

10. An interference suppression method for suppressing interference signal for a received signal including a plurality of slots having a known series symbol part for estimating a propagation channel and a data part, comprising:
a block dividing step for dividing said data part of each slot of the received signal into a plurality of blocks;
a first channel estimate calculation step for calculating a channel estimate for a current slot of the plurality of slots by using said known series symbol part of a received signal;
a first channel estimate calculation step for calculating a channel estimate for a previous slot of the plurality of slots by using said known series symbol part of a received signal;
a second channel estimate calculation step for each block for calculating a channel estimate for each block corresponding to each of said plurality of blocks by using a result of primary interpolation between the channel estimate for the current slot calculated at said first channel estimate calculation step and the channel estimate for the previous slot;
a channel estimate storage step for storing the first channel estimate for the current slot calculated at said first channel estimate calculation step for the current slot;
a channel estimate storage step for storing the channel estimate for the previous slot calculated at said first channel estimate calculation step for the previous slot; and
a suppression step for suppressing said interference signal by performing a calculation for said each block corresponding to said channel estimate for each block by using said channel estimate for each block.

11. The interference suppression method according to claim 10, wherein a calculation performed at said suppression step is single user detection.

12. The interference suppression method according claim 10, wherein a calculation performed at said suppression step is joint detection.

13. The interference suppression method according to claim 10, wherein a calculation performed at said suppression step is RAKE combination.

14. The interference suppression method according to claim 10, wherein
said second channel estimate calculation step for each block does not calculate a channel estimate for each block when no channel estimate for a previous slot is stored in said channel estimate storage step, and demodulation of the current slot is stopped;
the first channel estimate calculation step calculates a channel estimate for a next slot; and
the second channel estimate calculation step for each block for calculating a channel estimate for each block corresponding to each of said plurality of blocks for the current slot by using a result of primary interpolation between a channel estimate for the next slot and a channel estimate stored for the current slot in said channel estimate storage step.

15. The interference suppression method according to claim 10, wherein said second channel estimate calculation step for each block determines the number of blocks corresponding to a magnitude of a difference between a channel estimate calculated at said first channel estimate calculation step and a channel estimate stored in said channel estimate storage step, then said block dividing step divides said data part of a received signal into a plurality of blocks as the number of blocks determined at said second channel estimate calculation step for each block.

16. The interference suppression method according to claim 10, wherein said second channel estimate calculation step for each block determines the number of blocks corresponding to a result of comparison between a fading frequency of a propagation channel and threshold values f1, f2, then said block dividing step divides said data part of a received signal into a plurality of blocks as the number of blocks determined at said second channel estimate calculation means for each block.

17. The interference suppression method according to claim 10, wherein said second channel estimate calculation step for each block determines the number of blacks corresponding to a type of data modulation being used, then said block dividing step divides said data part of a received signal into a plurality of blocks as the number of blocks determined at said second channel estimate calculation means for each block.

18. The interference suppression method according to claim 10, wherein said second channel estimate calculation step for each block determines the number of blocks corresponding to modulation and a coding rate being adaptively used, then said block dividing step divides said data part of a received signal into a plurality of blocks as the number of blocks determined at said second channel estimate calculation means for each block.

* * * * *